(12) United States Patent
Kemp

(10) Patent No.: US 7,757,426 B2
(45) Date of Patent: Jul. 20, 2010

(54) FISHING LURE

(76) Inventor: Richard L. Kemp, 6977 Lone Oak Blvd., Naples, FL (US) 34109

( * ) Notice: Subject to any disclaimer, the term of this patent is extended or adjusted under 35 U.S.C. 154(b) by 0 days.

(21) Appl. No.: 12/385,305

(22) Filed: Apr. 3, 2009

(65) Prior Publication Data

US 2009/0260275 A1  Oct. 22, 2009

Related U.S. Application Data

(60) Provisional application No. 61/071,326, filed on Apr. 22, 2008.

(51) Int. Cl.
*A01K 85/00* (2006.01)
*A01K 85/14* (2006.01)

(52) U.S. Cl. .............. 43/43.15; 43/42.11; 43/42.15; 43/42.39; 43/42.5

(58) Field of Classification Search ............. 43/43.15, 43/43.1, 42.74, 42.11, 42.13, 42.15, 42.39, 43/42.36, 42.5, 44.96, 44.97
See application file for complete search history.

(56) References Cited

U.S. PATENT DOCUMENTS

| | | | | | |
|---|---|---|---|---|---|
| 725,428 | A | * | 4/1903 | Evans | 43/43.1 |
| 744,942 | A | * | 11/1903 | Stewart | 43/42.5 |
| 1,227,325 | A | * | 5/1917 | Schilling | 43/43.15 |
| 1,720,287 | A | * | 7/1929 | Moore | 43/43.15 |
| 1,923,840 | A | * | 8/1933 | Ozburn | 43/42.13 |
| 1,974,381 | A | * | 9/1934 | Swanson et al. | 43/42.74 |
| 2,109,693 | A | * | 3/1938 | Gaines et al. | 43/43.15 |
| 2,122,836 | A | * | 7/1938 | Gegerfeldt | 43/42.74 |
| 2,157,003 | A | * | 5/1939 | Mussina | 43/42.74 |
| 2,157,819 | A | * | 5/1939 | Eckert | 43/43.15 |
| 2,266,234 | A | * | 12/1941 | Mitchell | 43/42.13 |
| 2,274,131 | A | * | 2/1942 | Edberg | 43/42.72 |
| 2,289,663 | A | * | 7/1942 | Linhares | 43/42.74 |
| 2,494,620 | A | * | 1/1950 | Johnson | 43/44.84 |
| 2,506,854 | A | * | 5/1950 | Brown | 43/44.98 |
| 2,538,484 | A | * | 1/1951 | Tenn | 43/42.39 |
| 2,545,185 | A | * | 3/1951 | Winslow | 43/42.36 |
| 2,559,542 | A | * | 7/1951 | Corban | 43/42.15 |
| 2,589,715 | A | * | 3/1952 | Lysikowski | 43/42.74 |
| 2,591,294 | A | * | 4/1952 | Ripich | 43/43.15 |
| D169,303 | S | | 4/1953 | Dawson | |
| 2,683,324 | A | * | 7/1954 | Engelman | 43/42.74 |
| 2,781,604 | A | | 3/1955 | Brown | |

(Continued)

FOREIGN PATENT DOCUMENTS

DE          19936914 A1 * 12/2000

(Continued)

*Primary Examiner*—Darren W Ark
(74) *Attorney, Agent, or Firm*—Richard C. Litman

(57) ABSTRACT

The fishing lure is a complete fishing rig for attachment to the end of a fishing line. A pair of connecting rods are attached to a fishing line by a swivel attachment. A slidable weight is mounted on the first connection rod, and a spoon is attached to a four to six foot length of clear durable line, which is secured to the second connecting rod. The weight is formed from polyurethane resin with an embedded sinker, and the spoon is formed from epoxy resin. The connecting rods prevent tangling of the fishing lure rig and the fishing line, making the lure easier to cast off shore, and making the fishing lure more attractive to the fish.

20 Claims, 3 Drawing Sheets

U.S. PATENT DOCUMENTS

| | | | |
|---|---|---|---|
| 2,759,291 A * | 8/1956 | Foglio | 43/43.15 |
| 2,791,060 A * | 5/1957 | Kender | 43/43.15 |
| 2,814,151 A * | 11/1957 | Knapton | 43/43.15 |
| 2,850,834 A * | 9/1958 | Parrish | 43/42.11 |
| 2,851,815 A * | 9/1958 | Warner | 43/42.5 |
| 2,851,816 A * | 9/1958 | Gehrig | 43/43.1 |
| 2,907,133 A * | 10/1959 | Myers | 43/43.1 |
| 2,961,793 A * | 11/1960 | Buchanan | 43/42.74 |
| 2,977,709 A * | 4/1961 | Keiter | 43/43.13 |
| 3,082,562 A * | 3/1963 | Duncan | 43/43.1 |
| 3,137,962 A * | 6/1964 | Linley, Sr. | 43/43.15 |
| 3,180,052 A * | 4/1965 | Malesko | 43/44.97 |
| 3,190,029 A * | 6/1965 | Bondi | 43/42.74 |
| 3,217,443 A * | 11/1965 | Goodman | 43/42.74 |
| 3,253,363 A * | 5/1966 | Steehn | 43/42.13 |
| 3,364,614 A * | 1/1968 | Huebotter | 43/43.15 |
| 3,421,250 A * | 1/1969 | Krieg | 43/42.74 |
| 3,426,468 A * | 2/1969 | Hinkson | 43/43.15 |
| 3,495,350 A * | 2/1970 | Lievense | 43/42.5 |
| 3,500,576 A * | 3/1970 | Ostrom | 43/44.81 |
| 3,609,908 A * | 10/1971 | Martin | 43/44.97 |
| 3,638,347 A * | 2/1972 | Kochevar | 43/42.39 |
| 3,680,246 A * | 8/1972 | Florek | 43/43.15 |
| 3,744,178 A * | 7/1973 | Denny | 43/42.74 |
| 3,747,256 A * | 7/1973 | Haddock | 43/42.13 |
| 3,798,824 A * | 3/1974 | Nikota | 43/43.15 |
| D231,452 S | 4/1974 | Roberts | |
| 3,805,438 A * | 4/1974 | McLaughlin | 43/42.74 |
| 3,858,343 A * | 1/1975 | Goforth | 43/42.39 |
| 3,890,736 A * | 6/1975 | Worden | 43/42.11 |
| 3,942,281 A * | 3/1976 | Hill | 43/42.39 |
| 3,943,651 A * | 3/1976 | Erving | 43/42.13 |
| 3,986,291 A | 10/1976 | Hopper | |
| 3,991,505 A * | 11/1976 | Simeti | 43/42.74 |
| 3,996,688 A * | 12/1976 | Hardwicke, III | 43/42.11 |
| 4,011,681 A * | 3/1977 | Johnson | 43/42.11 |
| 4,033,065 A * | 7/1977 | Shannon | 43/42.13 |
| 4,035,945 A * | 7/1977 | Newman | 43/43.15 |
| 4,138,791 A * | 2/1979 | Anson | 43/43.15 |
| 4,139,960 A * | 2/1979 | Chojnowski | 43/43.1 |
| 4,142,319 A * | 3/1979 | Mihaljevic | 43/42.5 |
| 4,161,838 A * | 7/1979 | Gapen | 43/42.11 |
| D258,305 S * | 2/1981 | Dickinson et al. | D22/145 |
| D259,436 S * | 6/1981 | Dickinson et al. | D22/145 |
| D259,505 S * | 6/1981 | Dickinson et al. | D22/145 |
| 4,314,420 A * | 2/1982 | Dickinson et al. | 43/42.39 |
| 4,428,144 A * | 1/1984 | Dickinson | 43/44.96 |
| D274,081 S * | 5/1984 | Smith | D22/134 |
| 4,467,550 A * | 8/1984 | Haulk | 43/44.97 |
| 4,671,007 A * | 6/1987 | Stanczyk | 43/42.13 |
| 4,727,676 A * | 3/1988 | Runyan | 43/43.1 |
| 4,750,289 A * | 6/1988 | Rossa | 43/44.96 |
| 4,756,115 A * | 7/1988 | Reyen | 43/42.74 |
| 4,794,721 A * | 1/1989 | Rowe et al. | 43/42.13 |
| 4,817,326 A | 4/1989 | Benjestorf | |
| 4,891,901 A * | 1/1990 | Baker, Jr. | 43/42.13 |
| 4,920,687 A * | 5/1990 | Barnett | 43/42.74 |
| 4,956,933 A * | 9/1990 | Radtchenko | 43/42.5 |
| 4,962,610 A * | 10/1990 | Bleam et al. | 43/42.5 |
| 4,998,374 A * | 3/1991 | Barnett | 43/42.74 |
| 5,027,545 A * | 7/1991 | Lowrie et al. | 43/44.97 |
| 5,054,227 A * | 10/1991 | Lin | 43/43.12 |
| 5,065,542 A * | 11/1991 | Lindaberry | 43/42.74 |
| 5,094,026 A * | 3/1992 | Correll et al. | 43/42.11 |
| 5,189,828 A * | 3/1993 | Summers | 43/43.1 |
| 5,222,317 A * | 6/1993 | Georgescu | 43/42.74 |
| 5,253,446 A * | 10/1993 | Ogle | 43/42.13 |
| 5,253,447 A * | 10/1993 | Rhinehart | 43/42.74 |
| 5,337,509 A * | 8/1994 | Harold | 43/42.74 |
| 5,381,621 A * | 1/1995 | Fuller | 43/42.13 |
| 5,555,668 A * | 9/1996 | Brasseur | 43/43.15 |
| 5,678,351 A | 10/1997 | Halterman, Jr. | |
| 5,887,380 A * | 3/1999 | Matlock | 43/42.74 |
| 5,950,348 A * | 9/1999 | Gruel | 43/43.15 |
| 5,974,723 A * | 11/1999 | Taibi | 43/42.13 |
| 6,047,493 A * | 4/2000 | Strampe | 43/44.96 |
| H001865 H * | 10/2000 | Aoki | 43/42.13 |
| 6,237,276 B1 * | 5/2001 | Storelli | 43/43.15 |
| 6,618,980 B1 * | 9/2003 | De Boer, Jr. | 43/42.74 |
| 6,675,524 B2 * | 1/2004 | McNally et al. | 43/42.13 |
| 6,745,511 B1 | 6/2004 | Falconer | |
| 6,955,005 B2 * | 10/2005 | Storelli | 43/43.15 |
| 7,010,881 B2 * | 3/2006 | Altman | 43/42.13 |
| 7,117,629 B2 | 10/2006 | Brzozowski | |
| 7,197,846 B1 * | 4/2007 | Gibson | 43/42.5 |
| 7,234,266 B2 * | 6/2007 | Thomas | 43/42.36 |
| 7,415,792 B1 * | 8/2008 | Noble | 43/43.15 |
| 7,469,497 B2 * | 12/2008 | Hergott | 43/42.11 |
| 7,493,724 B1 * | 2/2009 | Peterson | 43/42.5 |
| 7,621,070 B2 * | 11/2009 | Brasseur | 43/44.97 |
| 7,621,071 B2 * | 11/2009 | Brasseur | 43/44.97 |
| 2001/0005954 A1 * | 7/2001 | Hermanson | 43/43.1 |
| 2005/0166444 A1 * | 8/2005 | Taylor | 43/42.13 |
| 2006/0265937 A1 * | 11/2006 | Randall | 43/43.15 |
| 2007/0234633 A1 * | 10/2007 | Uselman et al. | 43/42.13 |
| 2008/0127541 A1 * | 6/2008 | Shelton | 43/42.13 |
| 2008/0172924 A1 * | 7/2008 | Thorne | 43/42.39 |
| 2008/0202015 A1 * | 8/2008 | Langer | 43/42.13 |
| 2008/0263935 A1 * | 10/2008 | Albrecht et al. | 43/42.13 |
| 2009/0211145 A1 * | 8/2009 | Thorne | 43/43.15 |

FOREIGN PATENT DOCUMENTS

| | | | |
|---|---|---|---|
| FR | 2 604 056 A1 | | 3/1988 |
| FR | 2729822 A1 * | | 8/1996 |
| FR | 2848777 A1 * | | 6/2004 |
| GB | 2 204 471 A | | 11/1988 |
| GB | 2264030 A * | | 8/1993 |

* cited by examiner

FISHING LURE

CROSS-REFERENCE TO RELATED APPLICATION

This application claims the benefit of U.S. Provisional Patent Application Ser. No. 61/071,326, filed Apr. 22, 2008.

BACKGROUND OF THE INVENTION

1. Field of the Invention

The present invention relates to fishing tackle, and more particularly to a fishing lure for attachment to a fishing line that provides for long distance, tangle-free casting.

2. Description of the Related Art

In recreational fishing, a lure is an object attached to the end of the fishing line and is typically designed to resemble and move like an item of fish prey. The purpose of the lure is to use movement, vibration and color to catch the fish's attention to make the fish bite the hook. Lures may be equipped with one or more single, double or treble hooks that are used to hook fish when they attack the lure. Lures are usually used with a casting type of rod and reel. When a lure is used for casting, it is continually cast out and retrieved, with the retrieval making the lure simulate swimming through the water. A skilled angler can explore many possible hiding places for fish through lure casting, which is a technique used when fishing in both freshwater and saltwater.

There are a wide variety of fishing lures in use. Lures may be moved in many different ways to resemble prey for the fish. The different lures are typically made to look like dying fish, or fast moving prey fish. Lures are tied with a knot onto a fishing line connected to a reel, and the reel is attached to a rod. The motion of the lure is made by winding the fishing line back onto the reel, by sweeping the fishing rod, or by being pulled behind a moving boat, which is generally known as "trolling". Fishing lures can be made from a variety of materials, such as wood, plastic, rubber, metal and cork. Lures can have many moving parts or, alternatively, have no moving parts. In the wide variety of lures, some lures may be retrieved relatively quickly, and others may be retrieved relatively slowly. Some of the lures are used by themselves, and others are used with additional lures.

One advantage of using artificial lures is a reduction in the use of fresh bait, which can be expensive and may result in over-harvesting of certain types of baitfish. An additional advantage of using artificial lures is that their use promotes increased survival of fish in catch-and-release areas, because lures reduce the incidence of deep hooking, which has been correlated to fish mortality in many studies.

In saltwater applications, "spoons" are often considered to be the most useful and easiest lures to use. The weight of the lure takes the lure to the bottom of the water, and the shiny surface and action of the lure attracts the fish, even as the lure is sinking through the water. Further, during most times of the year, spoons can be fished in such a way as to resemble any of the many small prey species that predominate coastal shallows, such as anchovies, menhaden and sardines, for example.

When surf fishing, it is preferable to use a fairly heavy weight lure in order to cast the lure a reasonable distance from the beach. It is also preferable to maintain a few feet of line between the weight and the lure, so that the lure will appear to move naturally. Because of the shape and motion of the spoon, however, the spoon moves and vibrates in the air as it does in the water. This can cause problems for a fisherman when attempting a long cast, as the motion of the lure can cause the line between the weight and the lure to wrap around the fishing line, requiring the fisherman to reel in the lure, untangle the line, and recast. This can interfere with the enjoyment and success of an afternoon of fishing. Thus, a fishing lure solving the aforementioned problems is desired.

SUMMARY OF THE INVENTION

The fishing lure is a complete fishing rig for attachment to the end of a fishing line. A hollow cylindrical weight is mounted onto a pair of pivotally connected stainless steel rods that are attached at the upper end to the end of a fishing line by a swivel connector. The second rod is attached to approximately four or five feet of clear line, with a spoon attached at the end. The rods are preferably made from stainless steel, so that they are resistant to rusting from exposure to salt water. The spoon is made from an epoxy resin, and has a shiny surface to attract the attention of a fish. The weight is made from polyurethane resin with an embedded lead sinker, and is painted a dark color that is attractive to fish. When cast, the weight pushes forward, and the two rods are forced into a 90° angle, allowing a long cast and preventing any tangling of the lure and the fishing line.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
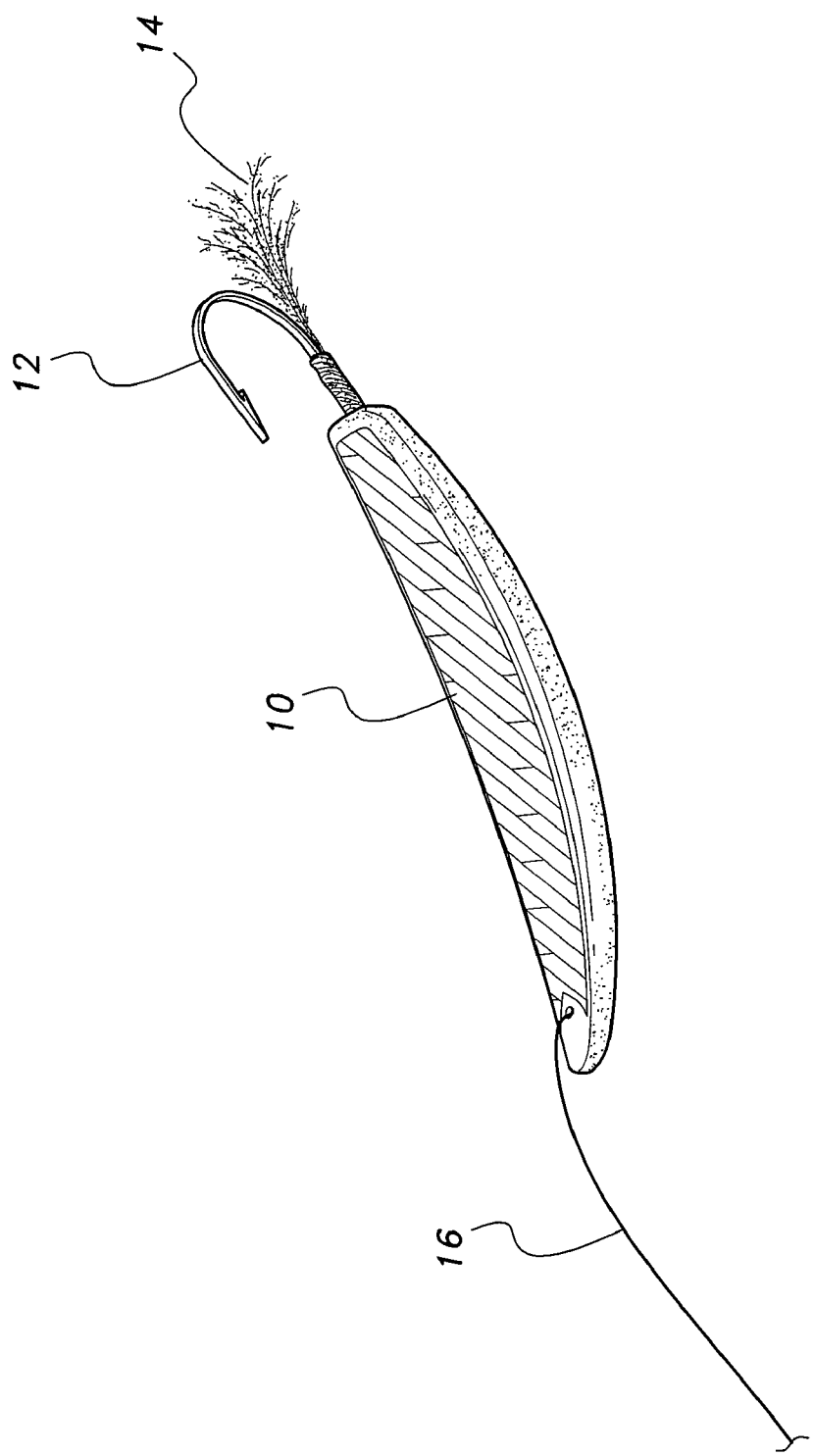
FIG. 1 is a perspective view of a fishing lure according to the present invention, showing the spoon.

The present invention relates to a fishing lure. FIG. 1 shows a spoon 10 having an attached hook 12, with a feather 14 attached to the hook 12. A clear or transparent leader line 16 is attached to the spoon 10. The spoon 10 is preferably formed from an epoxy resin, and has a shiny, or reflective, surface that is attractive to a fish. It should be understood that the spoon 10 is shown for exemplary purposes only, and that spoon 10 may have any desired contouring or dimensions. Additionally, feather 14 is shown for exemplary purposes only, and any suitable type of additional luring material may be added to spoon 10.

Figure 2:
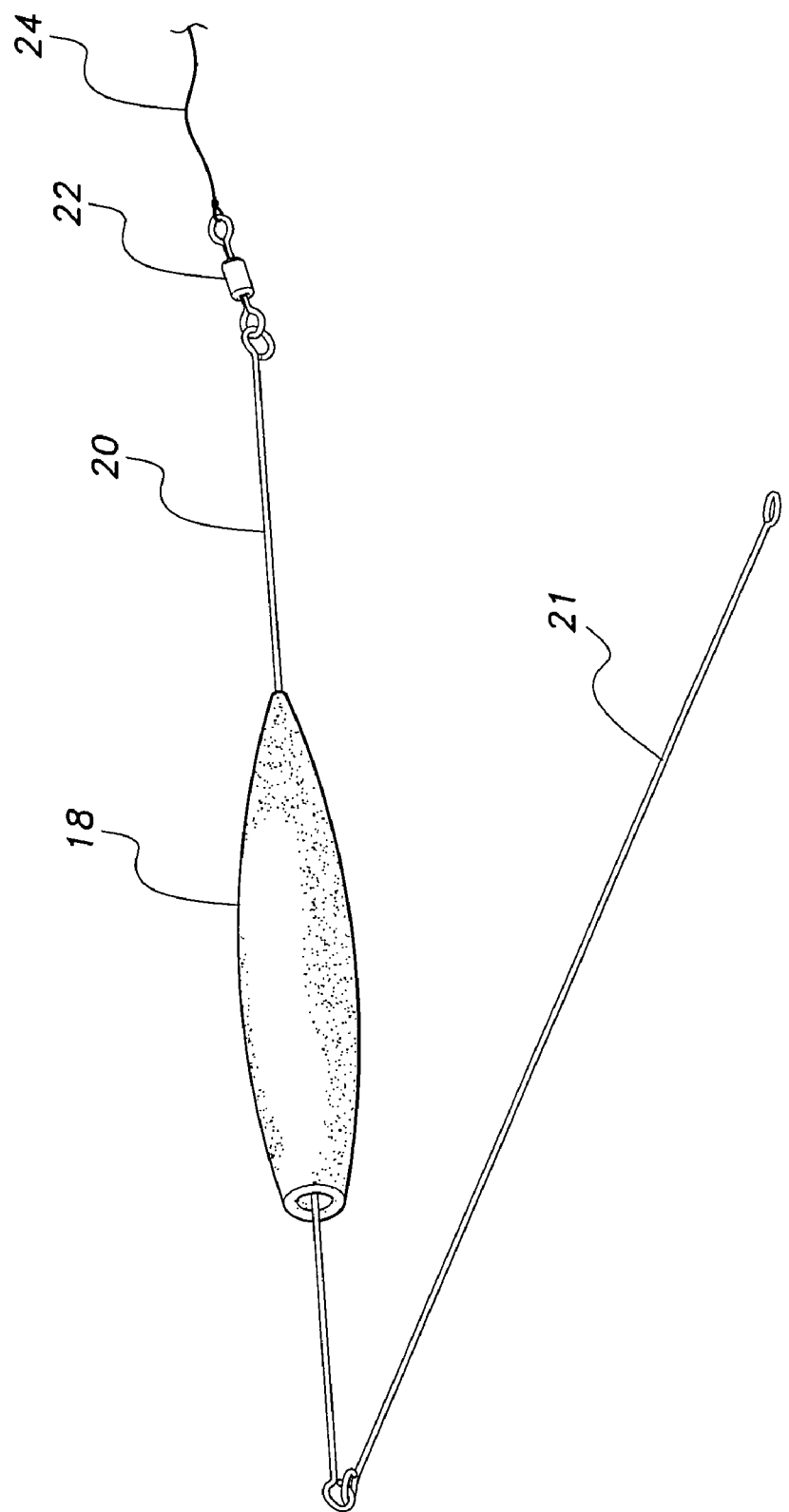
FIG. 2 is a perspective view of a fishing lure according to the present invention, showing the weight and connecting rods.

FIG. 2 shows a cylindrical weight 18 slidably mounted on an upper rod 20, which is attached to a fishing line 24 by a swivel attachment 22. The upper rod 20 is pivotally connected to a lower stainless steel rod 21. The weight 18 is preferably formed from a polyurethane resin. It should be understood that weight 18 is shown for exemplary purposes only, and that any suitable type of fishing weight may be mounted on upper rod 20. Rods 20, 21 may be formed from any suitable type of non-corrosive material, such as stainless steel, and may have any desired length.

Figure 3:
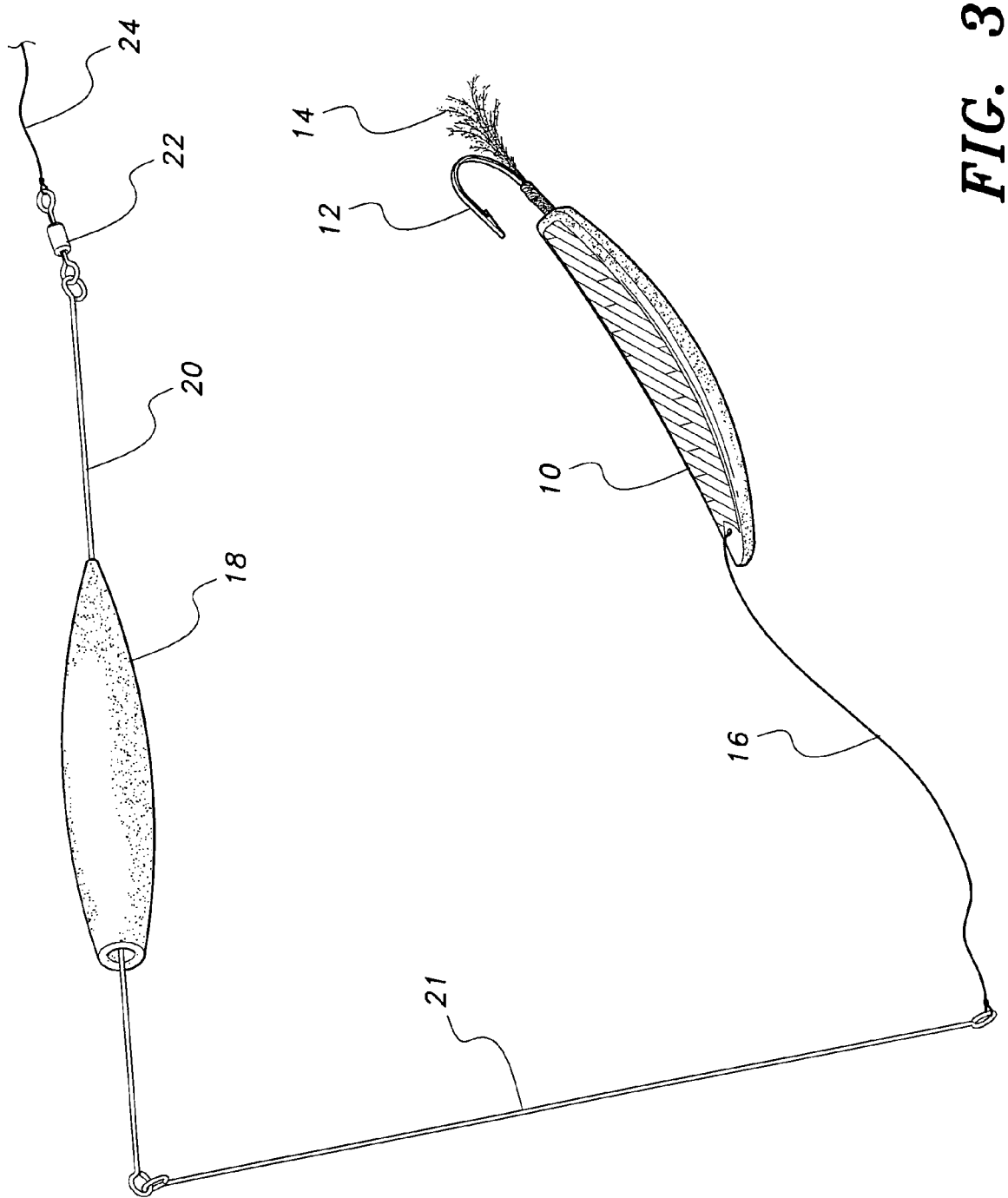
FIG. 3 is a perspective view of the fishing lure according to the present invention.

FIG. 3 shows the fishing lure configured for fishing. The upper rod 20 is connected to the fishing line 24 by the swivel attachment 22. It should be understood that swivel attachment 22 is shown for exemplary purposes only, and that any suitable type of swivel attachment for fishing lines may be utilized. The cylindrical weight 18 is slidably mounted on the upper rod 20. The lower rod 21 is pivotally connected to the upper rod 20 at one end, and the other end is attached to the leader line 16. Leader line 16 may be any suitable type of leader line. Preferably, leader line 16 is resistant to chewing and is further clear, so that the leader line 16 appears invisible to fish. The leader line 16 is preferably four to five feet in length, although it should be understood that any suitable length of leader line may be utilized.

The resin spoon 10 is attached to the leader line 16. When cast into the water by a fisherman, the weight 18 acts as a "teaser", attracting the attention of a fish, and the four to five foot length of leader line 16 between the lower rod 21 and the spoon 10 causes spoon 10 to appear more like natural prey to the fish, since fish cannot see the connection between the artificial rod 21 and the spoon 10. First rod 20 and second rod 21 may be pivotally connected to one another through any suitable type of pivotal attachment. It should be understood that the interconnecting loops shown in FIGS. 2 and 3 are shown only for exemplary purposes. Preferably, first rod 20 and second rod 21 pivot so as to form an angle therebetween up to 90°. This pivotal bend between the first rod 20 and the second rod 21 allows a long cast, and further prevents any tangles with the leader line 16 and the fishing line 24.

It is to be understood that while this embodiment is primarily intended for saltwater fishing, and adjusting the size of the spoon and the weight would make the fishing lure appropriate for use with different types and sizes of fish and for freshwater fishing.

It is to be understood that the present invention is not limited to the embodiment described above, but encompasses any and all embodiments within the scope of the following claims.

I claim:

1. A fishing lure, comprising:
    a first connecting rod having opposed first and second ends, the first end of the first connecting rod being secured to a fishing line;
    a second connecting rod having opposed first and second ends, the first end of the second connecting rod being pivotally attached to the second end of the first connecting rod, a first loop formed at the first end of the second connecting rod and a second loop formed at the second end of the first connecting rod, portions of the first and second loops extending through each other to form a pivotal attachment between the first end of the second connecting rod and the second end of the first connecting rod;
    a leader line connected to the second end of the second connecting rod;
    an elongated spoon having opposed first and second ends, the first end of the elongated spoon being attached to the leader line;
    a fish hook attached to the second end of said elongated spoon; and
    a weight slidably mounted on the first connecting rod between the first end of the first connecting rod and the second loop of the first connecting rod, the first connecting rod passing through the weight.

2. The fishing lure as recited in claim 1, wherein said elongated spoon has a concave surface.

3. The fishing lure as recited in claim 2, wherein the concave surface of said elongated spoon is reflective.

4. The fishing lure as recited in claim 3, wherein said elongated spoon is formed from an epoxy resin.

5. The fishing lure as recited in claim 1, further comprising a feather mounted on said elongated spoon adjacent said fish hook.

6. The fishing lure as recited in claim 1, wherein said weight is substantially cylindrical.

7. The fishing lure as recited in claim 6, wherein said weight is formed from polyurethane resin.

8. The fishing lure as recited in claim 1, wherein said first and second connecting rods are each formed from stainless steel.

9. The fishing lure as recited in claim 1, wherein said first and second connecting rods pivot with respect to one another between 0° and approximately 90°.

10. The fishing lure as recited in claim 1, further comprising a swivel connected to the first end of the first connecting rod, the swivel being adapted for attachment to the fishing line.

11. A fishing lure, comprising:
    a first connecting rod having opposed first and second ends;
    a swivel connected to the first end of the first connecting rod, the swivel attachment being adapted for attachment to a fishing line;
    a second connecting rod having opposed first and second ends, the first end of the second connecting rod being pivotally attached to the second end of the first connecting rod, a first loop formed at the first end of the second connecting rod and a second loop formed at the second end of the first connecting rod, portions of the first and second loops extending through each other to form a pivotal attachment between the first end of the second connecting rod and the second end of the first connecting rod;
    a leader line connected to the second end of the second connecting rod;
    an elongated spoon having opposed first and second ends, the first end being secured to the leader line;
    a fish hook attached to the spoon opposite the leader line; and
    a weight slidably mounted on the first connecting rod between the first end of the first connecting rod and the second loop of the first connecting rod, the first connecting rod passing through the weight.

12. The fishing lure as recited in claim 11, wherein said elongated spoon has a concave surface.

13. The fishing lure as recited in claim 12, wherein the concave surface of said elongated spoon is reflective.

14. The fishing lure as recited in claim 13, wherein said elongated spoon is formed from an epoxy resin.

15. The fishing lure as recited in claim 11, further comprising a feather mounted on said elongated spoon adjacent said fish hook.

16. The fishing lure as recited in claim 11, wherein said weight is substantially cylindrical.

17. The fishing lure as recited in claim 16, wherein said weight is formed from polyurethane resin.

18. The fishing lure as recited in claim 11, wherein said first and second connecting rods are each formed from stainless steel.

19. The fishing lure as recited in claim 11, wherein said first and second connecting rods pivot with respect to one another between 0° and approximately 90°.

20. The fishing lure as recited in claim 11, wherein the leader line has a length between approximately four feet and six feet.

* * * * *